Sept. 17, 1929.　　　S. HAMMER　　　1,728,543
MOUNTING FOR ELECTRIC METERS
Filed June 10, 1927　　2 Sheets-Sheet 1
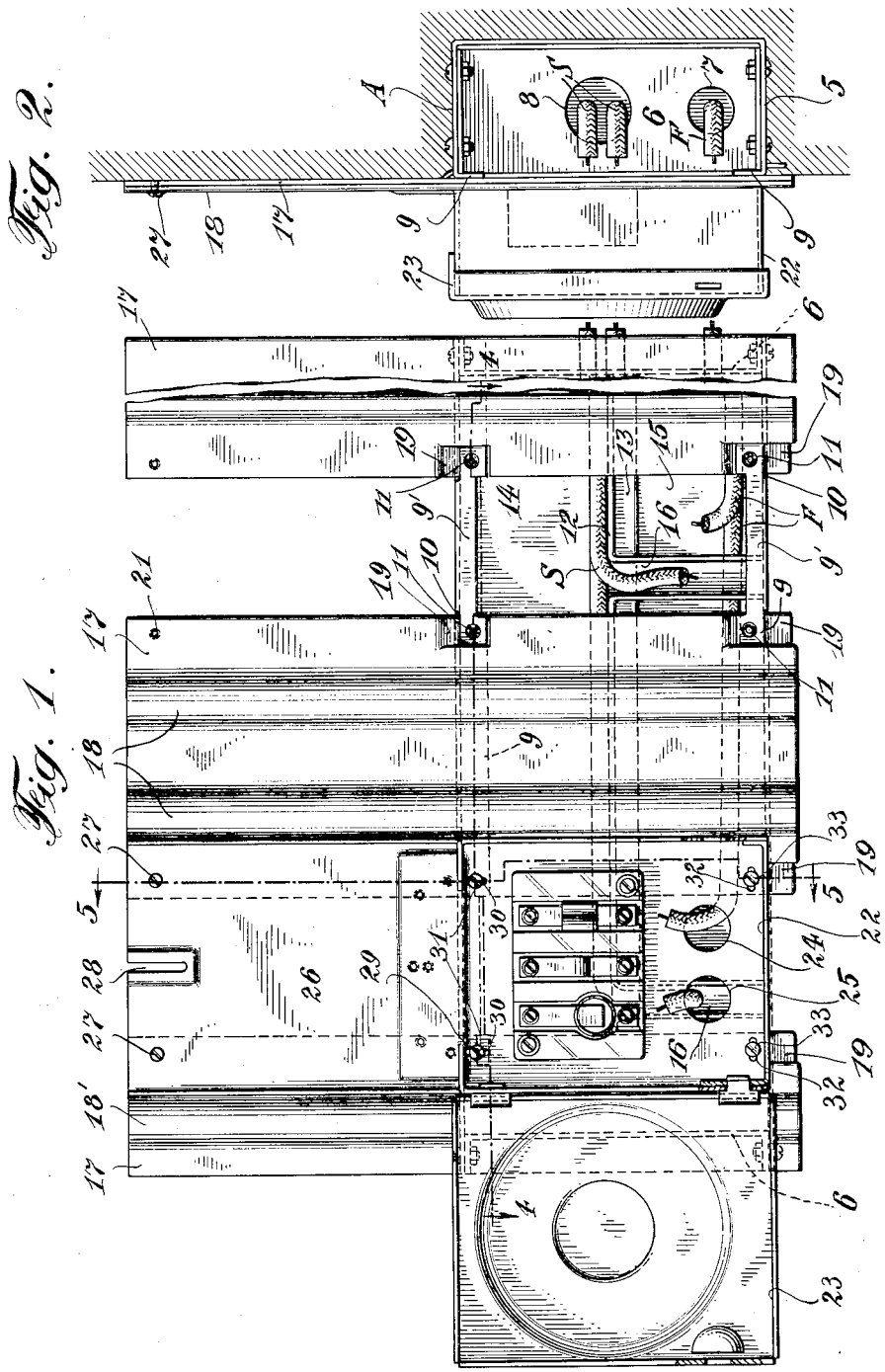
INVENTOR
Samuel Hammer
BY
ATTORNEY Sept. 17, 1929.  S. HAMMER  1,728,543
MOUNTING FOR ELECTRIC METERS
Filed June 10, 1927   2 Sheets-Sheet 2

INVENTOR
Samuel Hammer
BY C. P. Goepel
ATTORNEY

Patented Sept. 17, 1929

1,728,543

UNITED STATES PATENT OFFICE

SAMUEL HAMMER, OF BROOKLYN, NEW YORK, ASSIGNOR TO UNITED METAL BOX CO., INC., OF BROOKLYN, NEW YORK, A CORPORATION OF NEW YORK

MOUNTING FOR ELECTRIC METERS

Application filed June 10, 1927. Serial No. 197,841.

This invention relates to an improved mounting for electric meters, and has for its primary object to provide simple and inexpensive means for quickly and securely mounting or installing electric current meters and the entrance switch boxes therefor and which will satisfactorily comply with all municipal regulations and the fire underwriters requirements.

More particularly, it is an important object of the present disclosure to provide means adapted to be countersunk in the face of a building wall for segregating the feed wires and the house service wires from each other. In a preferred embodiment of the invention, this means is in the form of an elongated trough of stamped sheet metal having a central longitudinally extending partition dividing the same into two sections receiving the feed and service wires respectively.

It is a further object of my invention to provide an improved form and construction of adapter plates with means for interlocking the same with the upper and lower walls of the sheet metal trough and said trough walls and the adapter plates provided with means for engagement by attaching elements for the meter entrance switch boxes mounted upon spaced adapter plates over the open side of the trough, and said attaching devices being inaccessible when the switch box is closed and sealed.

It is also an additional object of my present improvements to provide the base wall of the switch box with a vertical extension also secured to the adapter plates and provided with suitable means for the attachment of the meter thereto.

With the above and other objects in view, the invention consists in the improved mounting for electric meters, and in the form, construction and relative arrangement of the several parts thereof as will be hereinafter more fully described, illustrated in the accompanying drawings, and subsequently incorporated in the subjoined claims.

In the drawings, wherein I have illustrated one simple and satisfactory embodiment of the invention, and in which similar reference characters designate corresponding parts throughout the several views,—

Figure 1 is a front elevation of a structure embodying one form of my present improvements for the mounting of a plurality of electric meters, and showing one of the meter entrance switch boxes in its applied position;

Fig. 2 is an end elevation of the device;

Figure 3:
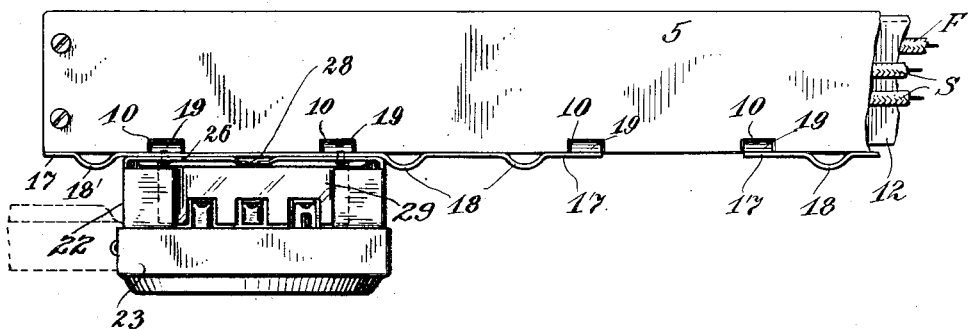
Fig. 3 is a top plan view.
Figure 4:
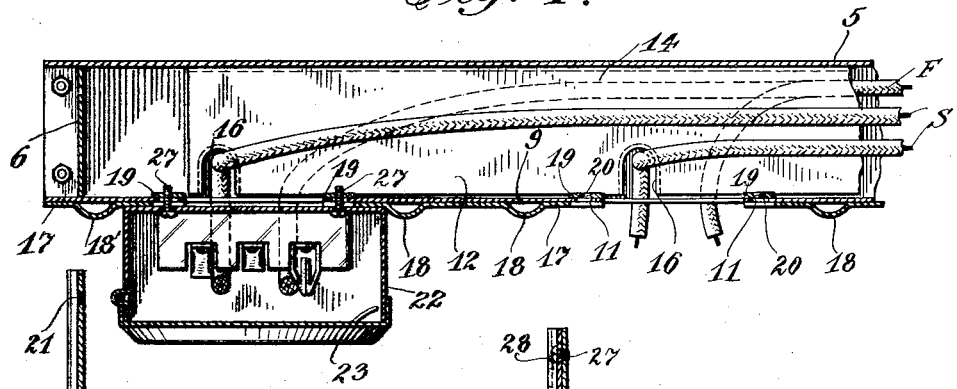
Fig. 4 is a longitudinal section taken substantially on the line 4—4 of Fig. 1.

Referring in detail to the drawings, in the construction which I have selected for purposes of illustration, the face of the building wall upon which the meters are to be installed is provided with a horizontally extending recess as indicated at A to receive a trough 5 preferably of rectangular form and consisting of a single sheet metal stamping, said trough being of the requisite predetermined dimensions and closed at its opposite ends by suitable end plates indicated at 6 fixed to the top and bottom walls of the trough. One of these end plates is provided with vertically spaced openings 7 and 8 therein to accommodate the feed wires and the house service wires respectively.

The top and bottom walls of the trough 5 are provided at their front edges with the longitudinally extending flanges 9 projecting inwardly and which are substantially flush with the face of the building wall. At longitudinally spaced points, said top and bottom walls of the trough at the juncture of the flanges 9 therewith are provided with slots or openings 10 and between these slots the flange 9 is preferably reduced in width as indicated at 9', said flange at opposite ends of these reduced portions and in line with the slots 10 being provided with openings 11.

Substantially midway between the top and bottom walls of the trough 5 and in parallel relation therewith, a longitudinally extending sheet metal partition wall 12 is arranged and is provided with a flange 13 on one edge which is suitably secured to the base wall of the trough, said partition wall extending from the base wall of the trough to the front open side thereof and terminating at its opposite ends in spaced relation to the end walls 6, though if desired, it will be understood that this partition wall may extend the entire length of said trough. The partition wall 12 thus divides the interior of the trough into upper and lower longitudinally extending sections or compartments 14 and 15 respectively. Preferably, I provide the partition wall 12 at predetermined longitudinally spaced points with integrally formed downwardly extending semi-tubular extensions 16 projecting at right angles to the plane of said wall and engaged at their lower ends with the lower longitudinal wall of the trough. The front open sides of these extensions 16 are positioned in the plane of the inner faces of the flanges 9′.

The electric meters and the entrance switch boxes therefor are supported upon adapter plates generally indicated at 17. It will be understood that the trough 5 may be made in various predetermined lengths according to the number of meters to be installed. The intermediate adapter plates 17 are relatively wide and are provided with spaced longitudinally extending corrugations 18, while the end adapter plates which are comparatively narrow are each provided with a single corrugation 18′. These corrugations strengthen or reinforce the metal adapter plates which are relatively long and are adapted to be arranged transversely across the open side of the trough 5 to extend above the same as shown in Fig. 1 of the drawings. When the housing or trough 5 is not set into the wall structure as shown but is merely attached to the face thereof, the upwardly projecting parts of the adapter plates 17 provide a rigid supporting means for the meter.

Figure 6:
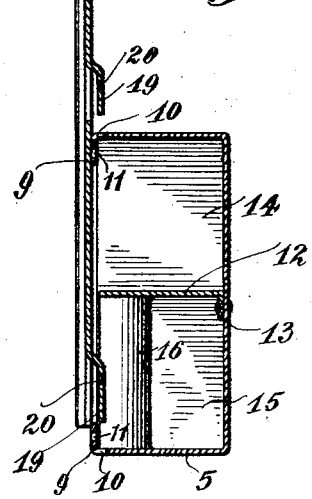
Fig. 6 is a similar vertical section illustrating the manner of applying the adapter plates.
Figure 5:
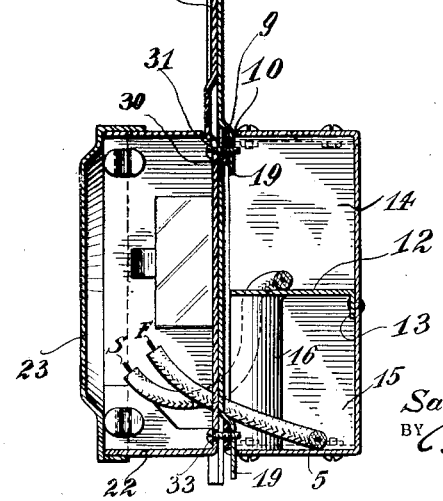
Fig. 5 is a vertical sectional view taken substantially on the line 5—5 of Fig. 1.

The intermediate adapter plate or plates 17 is provided upon each of its longitudinal edges and the end plates upon one of their longitudinal edges with longitudinally spaced angularly offset tongues 19 disposed out of the plane of said plate. As will be seen from reference to Fig. 6 of the drawings, the lower tongues 19 are of greater length than the upper tongues. Each of these tongues is provided with a threaded opening 20. In applying the adapter plates, they are positioned relative to the front side of the trough 5 substantially as seen in Fig. 6 and then moved downwardly, the lower tongues 19 being first engaged behind the lower flange 9 of the trough and through the slots or openings 10. As these lower tongues enter the openings 10, the upper tongues 19 enter the openings 10 in the top wall of the trough and are moved downwardly behind the upper flange 9. The threaded openings 20 in said tongues are thus brought into alignment with the openings 11 in the trough flanges. Adjacent its upper end, each adapter plate is also provided with threaded openings 21.

After the adapter plates have been thus mounted upon the trough as shown in Fig. 1 of the drawings, the meter entrance switch box is then applied in position. As herein shown, this switch box includes a rectangular body 22 of stamped sheet metal and a cover member 23 suitably hinged to one side wall thereof. Since the switch mechanism contained within this box constitutes no essential feature of my present invention, it will not be herein described in detail. For the purposes of this explanation, it will suffice to state that the base wall of the box body 22 is provided adjacent the lower end of the box with spaced openings 24 and 25 therein. This base wall of the switch box is formed with an integral upwardly extending part 26 upon which the meter is adapted to be arranged and secured. The part 26 adjacent its upper end is provided with suitably located openings to register with the openings 21 for the purpose of receiving the attaching screws 27 and this upper end of the part 26 is also centrally provided with an offset portion having a vertically extending slot 28 open at its upper end and adapted to receive a T-head bolt on the back of the meter casing (not shown).

The opposite side walls of the box body 22 at their upper ends are flanged inwardly and spaced apart to provide the space or opening indicated at 29 through which the connections may be made between the meter and the switch terminals.

The switch box is arranged in position between the spaced adapter plates 17 as shown in Fig. 1, the base wall of the box and its extension 26 lapping over upon the edges of the adjacent adapter plates. Said base wall of the switch box adjacent its upper end is provided with vertical slots 30 through which the fastening screws 31 are adapted to be inserted, said slots aligning with the openings 11 in the upper trough flange 9, and the screws being engaged in the threaded openings 20 of the upper tongues 19 on the adapter plates. Adjacent the lower end of the switch box, the base wall thereof is provided with horizontal slots 32 to receive similar fastening screws 33 which are threaded into the openings 20 of the lower tongues 19 and engaged through the openings 11 of the lower flange 9 of the trough. Thus, it will be understood that when the switch box cover 23 is closed and sealed, these attaching screws are inaccessible. When said switch box has been thus applied in position, the opening 24 is in communication with the lower section or compartment 15 of the trough 5 while the other opening 25 is opposed to the open side of one of the semi-tubular vertical extensions 16 of the partition wall 12. Thus, it will be understood that the feed wires indicated at F are extended through the lower section 15 of the trough then through the openings 24 of the respective switch boxes and connected with the proper terminals while the house service wires indicated at S are extended through the upper compartment 14 of the trough 5 and then downwardly through the respective tubular extensions 16 of the partition wall 12 and the openings 25 of the respective switch boxes. Thus, these service wires are entirely segregated and kept out of contact with the feed wires so that any possibility of a short circuit is obviated. This construction also operates to prevent the theft of current by the tenant. However, in cases where the fire underwriters requirements are not so strict, the service wires might be exposed for the short distance they extend through the section 15 of the trough to the opening 25 in the switch box wall, and in such case, the extension 16 of the partition wall 12 can be eliminated, and said wall merely provided with an opening therein through which the wire can be drawn.

From the above description, it will be apparent that by means of my invention, any desired number of the electric meters and the entrance switch boxes can be easily and quickly installed or mounted in position upon the building wall. By means of the adapter plates and the means which I provide for detachably interlocking the same with the upper and lower walls of the trough or housing for the feed and service wires, said adapter plates and the meters and switch boxes can be very easily and quickly removed for the purpose of entirely exposing the open side of the trough or housing when it is necessary to renew the wiring, or make other repairs. It will also be observed that the several parts of the structure consist of sheet metal stampings of relatively simple form so that the parts can be manufactured in quantities at relatively small cost. When assembled in the manner above explained, a very rigid and substantial support is provided for the meters and switch boxes. It will however, be seen that my construction permits of the individual removal of any one of the meters and switch boxes in a series.

I have found the construction of the trough or housing 5 for the feed and service wires as above described to be very practical for the purpose in view. It is however, apparent that this part of my invention might also be produced in various other forms to satisfactorily subserve the intended purpose. Similarly, the adapter plates and the means for detachably mounting or interlocking the same with the walls of the trough might also be produced in various other structural forms. Likewise, the meter entrance switch box as herein shown is of more or less conventional construction in the art, and other forms of such boxes might be substituted for that illustrated in the drawings. Accordingly, it is to be understood that in the further practical development of my present improvements, I reserve the privilege of resorting to all such legitimate changes in the form, construction and relative arrangement of the several detail parts thereof as may be fairly embodied within the spirit and scope of the invention as claimed.

I claim:

1. In a mounting for electric meters, a housing for the feed and service wires open at one side, a meter entrance switch box and means for detachably mounting the same upon the open side of said housing, said switch box having a wall thereof provided with spaced openings to receive the feed and service wires respectively, and partition means within said housing for segregating the feed and service wires from each other.

2. In a mounting for electric meters, a housing for the feed and service wires open at one side, a meter entrance switch box and means for detachably mounting the same upon the open side of said housing, said switch box having a wall thereof provided with spaced openings to receive the feed and service wires respectively, a partition dividing the interior of the housing into separate compartments receiving the feed and service wires respectively, and segregating the same from each other and said partition having means for guiding the service wire from one of said compartments to one of the openings in the switch box wall, while maintaining such segregation of the wires, and the other of said openings communicating with the other housing compartment, to receive the feed wire therefrom.

3. In a mounting for electric meters, in combination with a housing for the feed and service wires open on one side, spaced adapter plates adapted to be arranged transversely across the open side of said housing, a meter entrance switch box having a base wall provided with an extension upon which the meter is adapted to be secured, said base wall and extension adapted for engagement upon the adjacent adapter plates, and a common means inaccessible when the switch box is closed for detachably securing said switch box and the adapter plates to said housing.

4. In a mounting for electric meters, in combination with an elongated housing for the feed and service wires open at one side, adapter plates adapted to be arranged transversely across the open side of the housing, said plates and the upper and lower walls of the housing having means whereby the plates may be detachably interlocked with the housing walls, a support for the meter adapted to be positioned upon the opposed edges of adjacent adapter plates, and a common means for detachably securing said meter support and the adapter plates in fixed relation to the housing.

5. In a mounting for electric meters, in combination with an elongated housing open at one side and a central longitudinal partition dividing the housing into separate compartments to receive the feed and service wires, adapter plates adapted to be arranged in spaced relation to each other across the open side of the housing, a meter supporting member adapted to be positioned upon the opposed edges of the adjacent adapter plates, and a common means for detachably securing the supporting member and the adapter plates in fixed relation to the housing.

6. In a mounting for electric meters, in combination with an elongated housing open at one side and a central longitudinal partition dividing the housing into separate compartments to receive the feed and service wires, adapter plates adapted to be arranged in spaced relation to each other across the open side of the housing, a meter entrance switch box adapted to be arranged on the opposed edges of adjacent adapter plates and having a part extending longitudinally between said plates to receive and support a meter and the base wall of the switch box being provided with spaced openings therein, opposed to the same compartment, one of said openings receiving one of said wires from one compartment, and said partition wall of the housing having means for directing the other wire from the other compartment of the housing through the other opening in the switch box wall, and a common means inaccessible when the switch box is closed for detachably securing said switch box and the adapter plates in fixed relation to the housing.

7. In a mounting for electric meters, in combination with an elongated sheet metal trough adapted to be arranged in a recess in a building wall and provided with a longitudinally extending partition to divide the interior of the trough into separate compartments to receive the feed and service wires, said trough being open on one side, means for mounting a plurality of meters and switch boxes upon the open side of the trough including a plurality of adapter plates adapted to be arranged in spaced relation to each other across the open side of the trough and said adapter plates and the walls of the trough having means to receive detachable fastening elements for the meter support and the switch box whereby the parts are fixed in assembled relation to each other with spaced openings in one wall of the switch box to receive the feed and service wires from the respective trough sections.

8. In a mounting for electric meters, in combination, an elongated trough adapted to be positioned in a recess in the building wall, said trough being open on one side and provided with a longitudinally extending partition dividing the interior thereof into separate compartments receiving the feed and service wires, said partition having a semi-tubular part extending at right angles to the plane of the partition wall across the section of the trough through which the feed wire extends, a meter entrance switch box having supporting means for the meter and provided in its base wall with spaced openings, and means inaccessible when the switch box is closed for detachably securing the same in fixed relation to the open side of the trough with one of said openings communicating directly with one compartment of said trough to receive the feed wire therefrom and the other opening registering with the open side of said semi-tubular extension of the partition wall to receive the service wire therefrom.

9. In a mounting for electric meters, a housing having a segregating partition therein dividing the interior of the housing into separate compartments open at one side of the housing and adapted to receive feed and service wires respectively, a meter entrance switch box, having openings in one wall positioned over one of the compartments, means for detachably securing the switch box over the open side of the housing to close the same including attaching elements inaccessible when the switch box is closed, and means guiding one of the wires from one of said housing compartments to one of the openings of the switch box wall and maintaining the complete segregation of the wires from each other.

10. In combination, a horizontally elongated housing having a horizontal segregating partition therein providing separate compartments to receive feed and service wires respectively, switch boxes mounted upon the housing and over the open sides of said compartments, one wall of each switch box having spaced openings opposed to one compartment, and means for guiding wires from one of said compartments to one opening of each switch box while maintaining complete segregation of such wires from the wires in the other compartment of the housing.

In testimony that I claim the foregoing as my invention, I have signed my name hereto.

SAMUEL HAMMER.